H. S. RADER.
CENTER BEARING.
APPLICATION FILED DEC. 18, 1908.
939,443.
Patented Nov. 9, 1909.
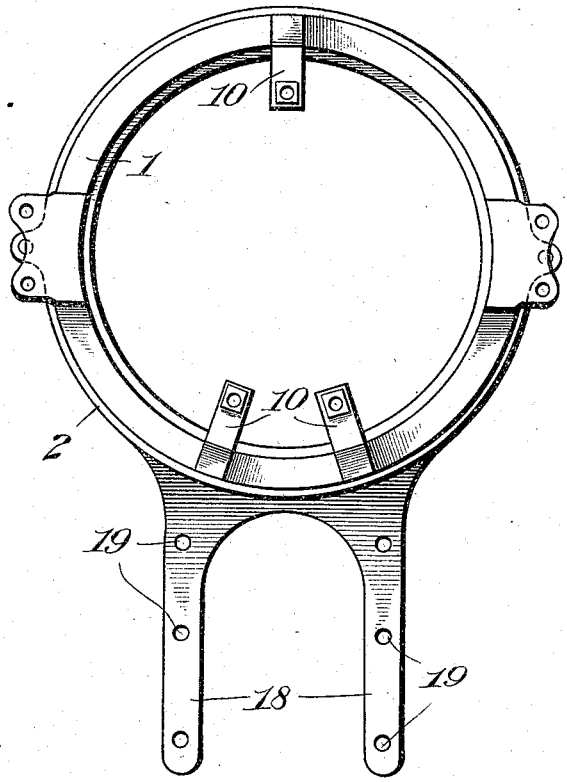
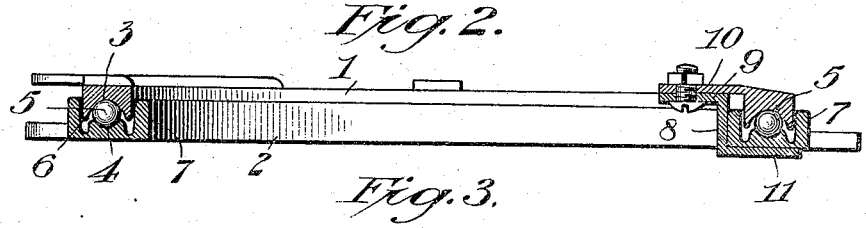
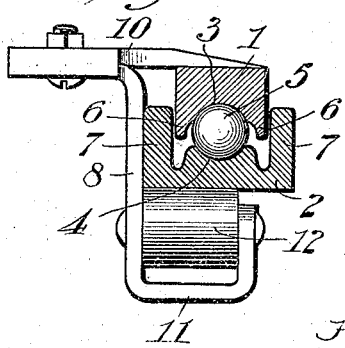
Witnesses
T. L. Mockabee
Robert Jones.
Inventor
Harvey S. Rader
By Rexford M. Smith
Attorney.

UNITED STATES PATENT OFFICE.

HARVEY S. RADER, OF PALMERTON, PENNSYLVANIA.

CENTER-BEARING.

939,443.

Specification of Letters Patent.

Patented Nov. 9, 1909.

Application filed December 18, 1908. Serial No. 468,191.

*To all whom it may concern:*

Be it known that I, HARVEY S. RADER, a citizen of the United States, residing at Palmerton, in the county of Carbon and State of Pennsylvania, have invented a certain new and useful Center - Bearing, of which the following is a specification, reference being had therein to the accompanying drawing.

This invention relates to center bearings, the object of the invention being to provide a practical anti-friction center bearing which is adapted for use either on vehicles such as wagons, carriages or the like, or cars, and particularly street cars, trolley cars or the like.

The main object of the invention is to provide a protective grease channel in which a series of anti-friction balls is arranged to work, the balls being held between opposing sections of the bearing and said sections being provided with interfitting and overlapping concentric flanges which not only form a grease channel of circular contour but also act to exclude foreign matter from such channel, thus keeping the grease and the balls in good working condition.

With the above and other objects in view, the nature of which will more readily appear as the description proceeds, the invention consists in the novel construction, combination and arrangement of parts as herein fully described, illustrated and claimed.

In the accompanying drawings:—Figure 1 is a plan view of a fifth wheel embodying the present invention. Fig. 2 is a vertical diametrical section through the same. Fig. 3 is a detail section on an enlarged scale, showing a roller clip in place of an ordinary clip.

The center bearing comprises an upper section 1 and a lower section 2. In Figs. 1 and 2 the said upper and lower sections are shown as circular or annular while in Figs. 4 and 5 the sections are shown as rectangular. Each form of bearing, however, comprises essentially upper and lower sections which are provided respectively with ball races 3 and 4 in which travel a circular series of anti-friction balls 5. In Fig. 3 the upper section 1 is shown as provided in addition to the ball race 3 with depending concentric flanges 6 and the lower section is provided with upwardly extending concentric flanges 7.

It will be observed that the flanges of one section fit within the flanges of the other section thereby forming a channel between the sections, which channel is designed for the reception of grease wherewith to constantly lubricate the anti-friction balls 5, the flanges of one section overlapping the flanges of the other section, thus excluding foreign matter while permitting the up and down movement of the sections in the act of assembling and disassociating the same.

Under the arrangement shown in Figs. 1 and 2, the upper and lower sections 1 and 2 are held together by means of angle clips 8 each having an inwardly extending end portion 9 which is bolted or otherwise fastened to a lug 10 on the upper section, each clip also comprising a lower end portion 11 which extends under the lower section 2 and serves to retain the two sections in proper working relation to each other. Three of such clips and lugs are illustrated in Fig. 1.

In Fig. 3, a modified form of clip 8 is illustrated, the lower end portion 11 of said clip being shaped into the form of a fork carrying a pin on which a roller 12 is journaled, said roller bearing and working against the under side of the lower section 2.

One of the members is illustrated as provided with the usual attaching lugs or extensions 18 having holes 19 to receive suitable fastenings by means of which said member is secured to the running gear of a vehicle.

I claim:

A center bearing comprising upper and lower sections provided with oppositely arranged ball races, upwardly extending concentric flanges on the lower section, downwardly extending flanges on the upper section, the concentric flanges of one section embracing and overlapping the like flanges of the other section and forming an annular grease channel, a series of balls mounted in the ball races and between the concentric flanges by which they are inclosed, and retaining clips secured to one section and each embodying a fork carrying a pin, and a roller journaled on said pin and working against the other section to hold the sections together while permitting relative rotative movement thereof.

In testimony whereof I affix my signature in presence of two witnesses.

HARVEY S. RADER.

Witnesses:
JOHN CARTY,
JAMES TITUS.